(12) United States Patent
Blumenthal

(10) Patent No.: US 8,791,791 B2
(45) Date of Patent: Jul. 29, 2014

(54) SEA-BASED SECURITY ARCH FOR IDENTIFYING SHIPPING CONTRABAND

(75) Inventor: Benjamin Blumenthal, Waterloo (BE)

(73) Assignee: Benjamin Blumenthal, Dallas, TX (US)

( * ) Notice: Subject to any disclaimer, the term of this patent is extended or adjusted under 35 U.S.C. 154(b) by 155 days.

(21) Appl. No.: 13/494,992

(22) Filed: Jun. 13, 2012

(65) Prior Publication Data

US 2014/0009259 A1    Jan. 9, 2014

(51) Int. Cl.
| | |
|---|---|
| G05B 19/00 | (2006.01) |
| G01V 5/00 | (2006.01) |
| G05B 1/01 | (2006.01) |
| G06K 5/00 | (2006.01) |
| G03B 42/06 | (2006.01) |
| G01N 23/04 | (2006.01) |

(52) U.S. Cl.
CPC ............... *G05B 1/01* (2013.01); *G01V 5/0075* (2013.01); *G01V 5/0016* (2013.01)
USPC ................. 340/5.8; 235/380; 367/11; 378/57

(58) Field of Classification Search
USPC ............... 340/5.1–5.92; 235/380; 342/44–45; 380/229, 232; 713/155–159; 378/57
See application file for complete search history.

(56) References Cited

U.S. PATENT DOCUMENTS

| | | | | |
|---|---|---|---|---|
| 4,513,205 | A * | 4/1985 | Splinter | 250/507.1 |
| 5,284,404 | A * | 2/1994 | Hu | 405/142 |
| 5,838,759 | A * | 11/1998 | Armistead | 378/57 |
| 6,332,098 | B2 * | 12/2001 | Ross et al. | 700/226 |
| 6,332,290 | B1 * | 12/2001 | Delamare | 52/2.22 |
| 7,301,851 | B1 * | 11/2007 | Mixon et al. | 367/11 |
| 7,394,363 | B1 * | 7/2008 | Ghahramani | 340/539.22 |
| 7,762,760 | B2 * | 7/2010 | Takehara et al. | 414/803 |
| 7,895,948 | B2 * | 3/2011 | Dupont et al. | 102/399 |
| 8,412,147 | B2 * | 4/2013 | Hunter et al. | 455/404.1 |
| 2008/0042805 | A1 * | 2/2008 | Morhard et al. | 340/10.1 |
| 2008/0210810 | A1 * | 9/2008 | Parmley | 244/30 |
| 2008/0260467 | A1 * | 10/2008 | Kroecker et al. | 405/195.1 |
| 2008/0292050 | A1 * | 11/2008 | Goodenough et al. | 378/57 |
| 2012/0139696 | A1 * | 6/2012 | McQuade et al. | 340/5.7 |

* cited by examiner

*Primary Examiner* — Jennifer Mehmood
*Assistant Examiner* — Omar Casillashernandez

(57) ABSTRACT

The invention discloses devices and methods for analyzing inbound and outbound ships for illegal or dangerous cargo or persons. An arch is generally placed several kilometers from shore, the arch including a plurality of distinct analytical and diagnostic equipment. A ship passing through the arch is analyzed by photographic, thermal and other means for presence of explosives, nuclear, chemical, or biological agents, terrorists, contraband, illegal passengers and/or other potential threats. Results from scanning are sent to appropriate security officials as are data of ships that attempt to circumvent the security arch.

19 Claims, 10 Drawing Sheets

SEA-BASED SECURITY ARCH FOR IDENTIFYING SHIPPING CONTRABAND

FIELD AND BACKGROUND OF THE INVENTION

The present invention, in some embodiments, relates to devices and methods for effectively analyzing shipping traffic for potential contraband including but not limited to explosives, nuclear material, weaponry, biological or chemical agents, terrorists, illegal aliens, slaves, and illegal goods.

With the destruction of the Twin Towers, America began a rapid process of analyzing risks to its citizens, infrastructure, and national way of life. One of the first areas to create national concern was international shipping. Some ships reaching the US can carry over 14,000 standard shipping containers and overall the US receives and sends tens of millions of containers each year. Very few of these containers are actually inspected and the risk for entry of dangerous material such as radiological samples or dangerous individuals such as terrorists remains real.

With the above risks in mind and shipping-based threats high on Homeland Security priorities, technologies have been developed to analyze the millions of containers after reaching US shores. The prior art generally describes methods for scanning containers as they are necessarily transferred between ship and land-based transportation elements. The prior art does not generally discuss sea-based detection and warning systems.

U.S. Pat. No. 7,808,301 to Murphy, et al. describes a system and method for screening inter-modal shipping containers for the presence of weapons-of-mass-destruction, such as chemical-warfare agents, biological-warfare agents, radiological materials, nuclear material, or explosives.

U.S. patent application Ser. No. 11/052,600 et al. teaches non-intrusive inspection systems, including apparatuses and methods, for non-intrusively inspecting cargo containers employed, generally, in the cargo transportation industry. The non intrusive inspection systems utilize one or more, single or multi-energy electron accelerators arranged in a plurality of different arrangements and orientations to provide two and, essentially, three dimensional views of the contents of (i.e., objects within) a cargo container and to enable discrimination and identification of materials present within the contents thereof.

U.S. Pat. No. 7,267,239 to Takehara et al. describes a method for non-intrusive scanning of cargo containers quay side while the containers are being transferred between ship and land transportation utilizing a mobile cargo container handling buffer crane having a bridge crane mounted thereon for transferring cargo containers between a ship and land transportation with an intermediate transfer position whereby a suspended container can be non-invasively inspected by a longitudinally reciprocating container traversing radiation emitter apparatus.

U.S. Pat. No. 7,551,739 to Morgenstern teaches an invention for monitoring an item, such as a container. The invention includes a computer in communication with a receiver that receives signals from a remote source. A transmitter in communication with the computer receives values from the computer based on the signals received from the remote source. These values are then transmitted to a security device associated with the item, which includes an authentication table comprising a plurality of initial values. The security device then records values transmitted from the transmitter. The values can be jitter values, with each jitter value being a difference in arrival times of at least two timing signals from the same remote source.

SUMMARY OF THE INVENTION

It is therefore a purpose of the present invention, in some embodiments, to describe methods and devices for using a plurality of sensing systems at sea for detecting potentially dangerous cargo approaching or leaving a port.

The invention provides for a security system for interrogating shipping including the following: an arch, wherein the arch is of dimensions to allow for the facile passage of a freight, passenger, oil bearing or other ship through an open space of the arch; a plurality of sensing devices, wherein the devices are associated with the arch and may interrogate, scan, film, analyze, or interact with the ship or components thereof; and, a control system, wherein the control system controls the actions of the sensing devices and allows for communication of sensing data or ship non-compliance with authorities.

In one aspect of the security system, the arch is realized as a plurality of arches, each arch including a capability to determine and report ships that attempt to circumvent and not pass through the arch.

In another aspect of the security system, the arch is placed at a predetermined distance from a predetermined port, and wherein all shipping traffic associated with the port is required to pass through the arch, the shipping traveling generally at its normal speeds to or from the port.

In another aspect of the security system, the arch is placed a fixed position and further includes an incapacitating element to stop suspect shipping.

In another aspect of the security system, the arch is mobile and may be moved either under its own power or via a tow to a plurality of predetermined positions.

In another aspect of the security system, sensing devices include but are not limited to x-ray scanner, neutron scatter device, gamma ray counter, Geiger counter, photographic equipment, RFID readers, listening elements, infrared, explosive detectors, water testing elements, and other sensors for detecting illegal, dangerous, or unsafe cargo or persons.

In another aspect of the security system, the control system can identify potential security threats and relay information regarding the threats to official personnel, the relay performed via phone, Internet, radio, satellite, cable, wireless, or other forms of communication.

In another aspect of the security system, the predetermined distance is selected to allow for stoppage, quarantine and if necessary incapacitation of a suspicious or non-compliant ship.

The invention additionally includes a method for scanning inbound and outbound ships for potential threats, including the following: providing an arch, wherein the arch is of a size to allow for facile passage of a single ocean-bound ship, and wherein the arch is placed at a position several kilometers from a predetermined port; having inbound and outbound ships follow a course of passage through the arch; scanning the ships while in proximity to the arch for potential hazards; relaying to official personnel results from the scanning; and, quarantining, disabling or destroying ships attempting to circumvent inspection by the security arch.

In one aspect of the method, there are additional steps of detecting ships that attempt to circumvent the arch and relaying the information to port-based or national security personnel.

In another aspect of the method, the hazards include but are not limited to explosives, nuclear material, weaponry, biological agents, terrorists, illegal aliens, slaves, and illegal goods.

In still another aspect of the method, a portion of the arch may physically contact the ships and/or intake air or water samples from around the ships.

In yet another aspect of the method, the scanning is performed over the length and breadth of the ships above and below the water surface.

The invention includes a security arch for preventing dangerous contraband from reaching a port, including the following: an arch placed at a predetermined distance from a predetermined port or shore region; sensing equipment, wherein the sensing equipment is adapted to be directed at a ship passing underneath the arch for identifying the contraband or identifying a ship's attempt at circumvention of the arch; communication equipment wherein the communication equipment is adapted to allow for alerting appropriate authorities as to the existence of the contraband passing through the arch; and, disabling equipment, wherein the disabling equipment is adapted to allow for quarantining, disabling or destroying ships attempting to circumvent the inspection by the security arch.

In one aspect of the security arch, the arch is made from inflatable material.

In another aspect of the security arch, the arch is realized as an open structure lacking an overhead component.

In another aspect of the security arch, the arch may have its dimensions of height and width modified hydraulically.

In another aspect of the security arch, the sensing equipment is monitored and controlled by a user.

In another aspect of the security arch, the sensing equipment provides an output of sensing activities to the user.

In another aspect of the security arch, there is additionally an alarm system that may be activated by results from action of the sensing equipment, wherein the alarm system may activate elements for disabling or destroying a suspect ship.

Unless otherwise defined, all technical and/or scientific terms used herein have the same meaning as commonly understood by one of ordinary skill in the art to which the invention pertains. "Arch" or "security arch" may have a shape similar to an arch or may adopt a dissimilar shape, including but not limited to squared arch, where the overhead region is at 90 degree angles to the leg regions. Alternatively an arch for the present invention may involve two leg regions without recourse to an overhead region. "Sensing systems" or "sensing equipment" may generally refer to systems, devices or elements that can perform diagnostic or analytical action on a ship traveling through or in proximity to an arch as defined in the present invention. Sensing systems may be associated directly or indirectly with an arch. Specific sensing systems such as x-ray, thermal scanning, gamma ray counters and the like may generally have their accepted meanings as understood in the relevant arts. "Security personnel" may refer to private or government officials or employees who for the present invention are involved in the upkeep, performance or data interpretation relating to interaction of sensing systems and ships, as herewith described, or government officials or employees entrusted with safeguarding homeland security or working for intelligence gathering agencies that analyze possible threats to homeland security. A "user" may be anyone who receives data or information from sensing systems associated with an arch as per the instant invention. All other terms such as ship, port, slaves, terrorists and the like may generally have their normal meaning as understood in the relevant arts. The scanning methods described in the prior art are herewith incorporated into the present invention. A ship may include submarines, canoes, kayaks, and all other water-based vessels.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. It is noted that similar elements in various drawings will have the same number, advanced by the appropriate multiple of 100.

In the drawings.

DESCRIPTION OF SPECIFIC EMBODIMENTS OF THE INVENTION

Without being bound by any theory, the present invention is herewith described by way of several embodiments. The present invention, in some embodiments thereof, relates to analyzing ship cargo while said cargo is still at sea. A plurality of uniquely defined sensing elements may be placed on a arch-shaped structure to allow for scanning and analysis of a shipping passing through said arch on the ship's way to or from a major port.

Every year, billions of passengers are scanned prior to their boarding an airliner. Scanning is generally broken down into several components. An individual will almost always pass through a x-ray or similar scanning elements. His/her belongings will go through neutron scanning, visual inspection and possibly other analytical procedures. Mass-spectrometer based bomb residual detection may be applied. The goal of using multiple sensing systems is to provide the highest level of accuracy that a traveler and his/her luggage does not represent a threat to others. While passengers at the airport can spend a large portion of their time being scanned and analyzed, the millions of ships that ply their way from port to part generally do not undergo nearly as demanding an analytical treatment—in spite of the risk that the thousands of containers on a typical container ship may include contraband or dangerous materials.

The present invention, in some embodiments, attempts to apply airport-type thinking to the shipping industry. Ships are enormous, they carry huge amounts of cargo, and the cargo is sealed in containers stacked high throughout the length of the ship. Individual testing of containers would require a very significant amount of time and due to the tight packing of containers on many ships, such testing might be completely impossible. In some embodiments of the present invention, a ship—like an airline passenger—is directed to pass through a "scanning machine"; in the present invention, the scanning machine is realized as an arch that is bristling with a plurality of diagnostic and analytic devices. Passing through the arch, the ship may provide clues as to its cargo, either listed or otherwise. Signature molecules in the air around the containers (this air may be collected and analyzed), thermal images, or radiological energy may all provide clues that a ship in question represents a security threat and must therefore be quarantined.

First Embodiment

Figure 1:
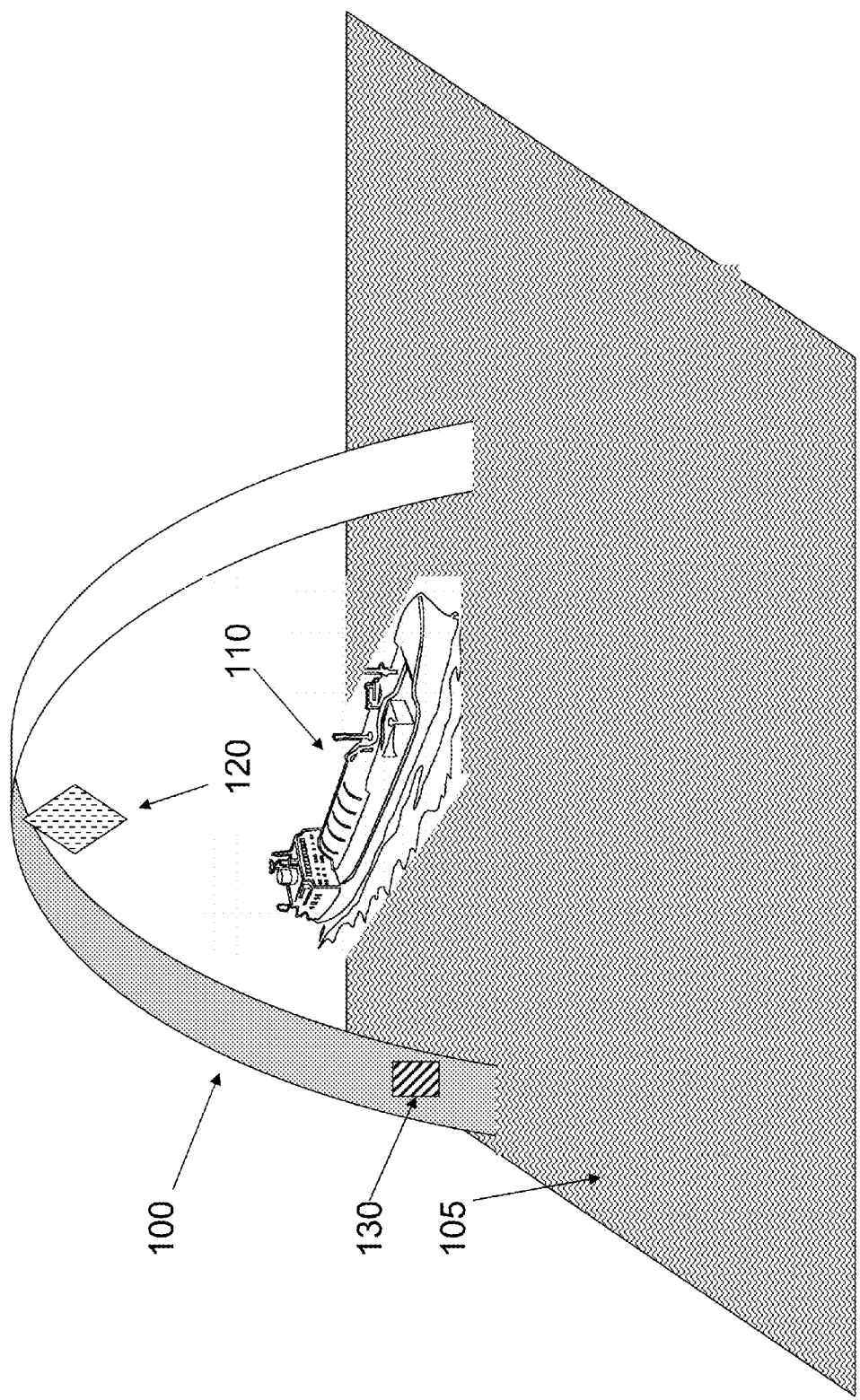
FIG. 1 is a schematic representation of a security arch according to an embodiment of the present invention.

For purposes of better understanding some embodiments of the present invention, as illustrated in FIGS. 1-10 of the drawings, reference is first made to FIG. 1 which shows a general conceptual schematic for an embodiment of the present invention. A Naval Intercept Security Arch (NISA) 100 is placed in a body of water 105 typically used for national or international shipping. The arch 100 is positioned near major shipping lanes to allow for a ship 110 to pass through the arch either in the ship's 110 approach to or egress from a port. The arch 100 has width and height to allow for facile passage of the largest of sea-going vessels. For example, Ultra Large Container Vessels (ULCV) can hold over 14,500 containers and has dimensions of 56 meter width and 397 meter length. An arch 100 must be designed to allow for facile passage of not only this vessel, the widest currently in use, but also for future vessels which may be wider; additionally, if the arch 100 is designed for passage of multiple vessels (not shown in this figure), then its width must be accordingly larger. The only concern with making an arch too wide is the possibility for reduced sensitivity of sensing devices by placing them further from a ship 110 undergoing scanning As mentioned in a later embodiment, features of an arch 100 may be movable so as to optimize the proximity of the arch sensing elements 120 to a passing ship 110. An arch 100 is designed so as to allow for ship 110 passage without any requirement for the ship 110 to reduce speed. The arch 100 includes a controller unit 130 for passing information from sensing elements 120 to authorities tasked with port safety. The controller unit 130 will generally be computer-based and will include capabilities for both recording data for each ship 110 passing through the arch 100 as well as for communicating said data or a portion thereof either wirelessly or via an appropriate cable to port security authorities.

As suggested in the instant embodiment, the present invention provides a passive system for analyzing ships entering or leaving a port. The present system does not necessarily check each container nor can it guarantee identification of problematic persons or materials that cannot be identified by sensing technologies envisioned for use in the present invention, some such technologies to be developed during the lifetime of the patent of the present invention. Still, the invention, as shown in the present embodiment, allows for identifying a ship and for gleaning critical diagnostic information about passenger, container, oil, and other ships without interfering with ship 110 travel speed or direction.

Second Embodiment

Figure 2:
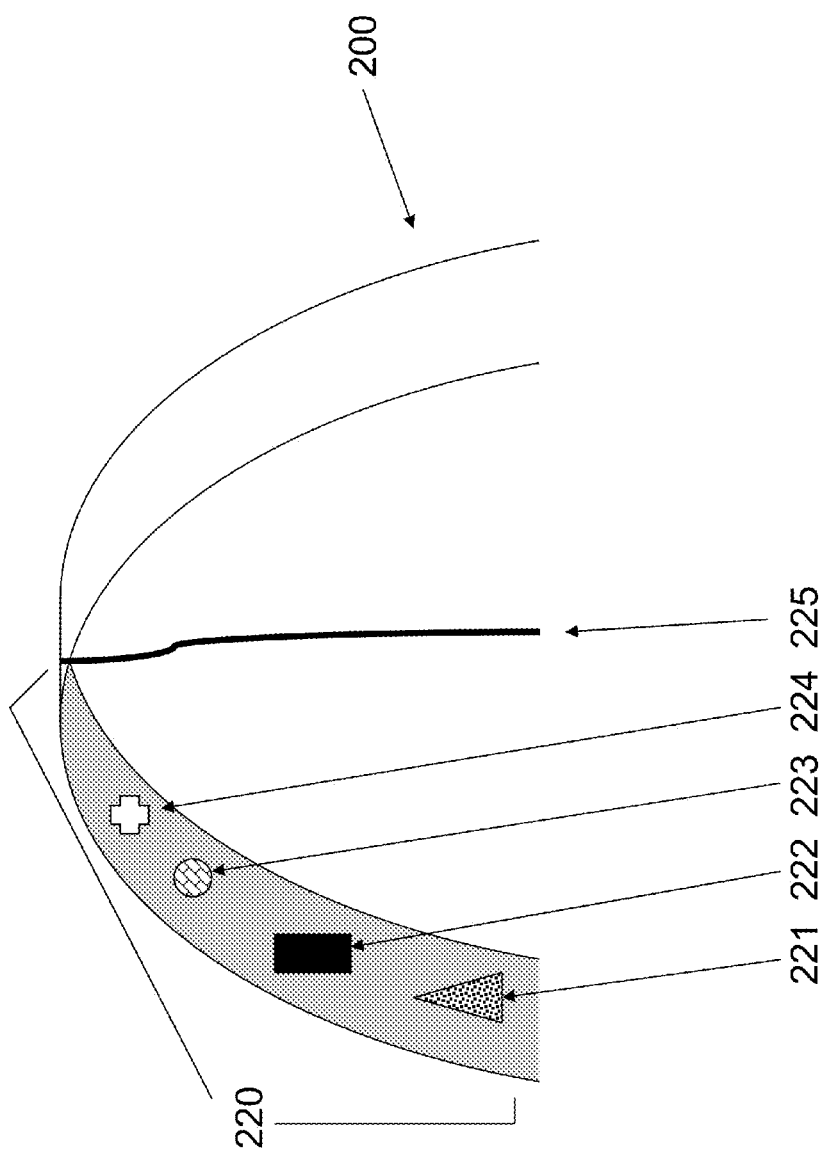
FIG. 2 is a schematic representation sensing equipment associated with an arch.

Attention is turned to FIG. 2 which shows a portion of a security arch 200. The arch 200 includes sensing elements 220 which are directed towards a ship (not shown in figure). The sensing elements 220 include but are not limited to cameras, infrared sensors, thermal sensors, Geiger counters, gamma ray counters, x-ray devices, air monitors, chemical analyzers, air monitors, biological sensors, and neutron scattering devices. RFID or similar elements associated with containers or ship (not shown) may additionally be detected by appropriate sensing elements 220 associated with a security arch 200. The sensing elements 220 may be separate as shown in FIG. 2 or may be combined. The sensing elements 220 may be on the side legs or top portion of an arch 200. Different arches may have different sensing elements 220. The sensing elements may monitor continuously or monitor as required when a ship is detected passing in proximity or through the security arch 200. Data from sensing elements 220 may be saved and/or transmitted to security officials. The security officials may be associated with the arch 200 or be located at a distant location, such as a nearby port. The sensing elements 220 are placed so as to allow for optimized scanning, diagnosing and analyzing passing ships. Sensing elements 220 as shown include a thermal scanning camera 221, a Geiger counter 222, an air sampler with biological detector 223, a radio frequency identification tag reader 224 as well as an explosives detector 225. One will note that the explosives detector 225 is long and is positioned so as to be dragged along the top and sides of exposed containers. Residues from explosives can be analyzed by the explosives detector 225. Sensing elements 220 may also be placed in the underwater portion of the arch (not shown) for detecting and sensing the bottom and exterior of surface vessels as well as submarine vessels.

Third Embodiment

Figure 3:
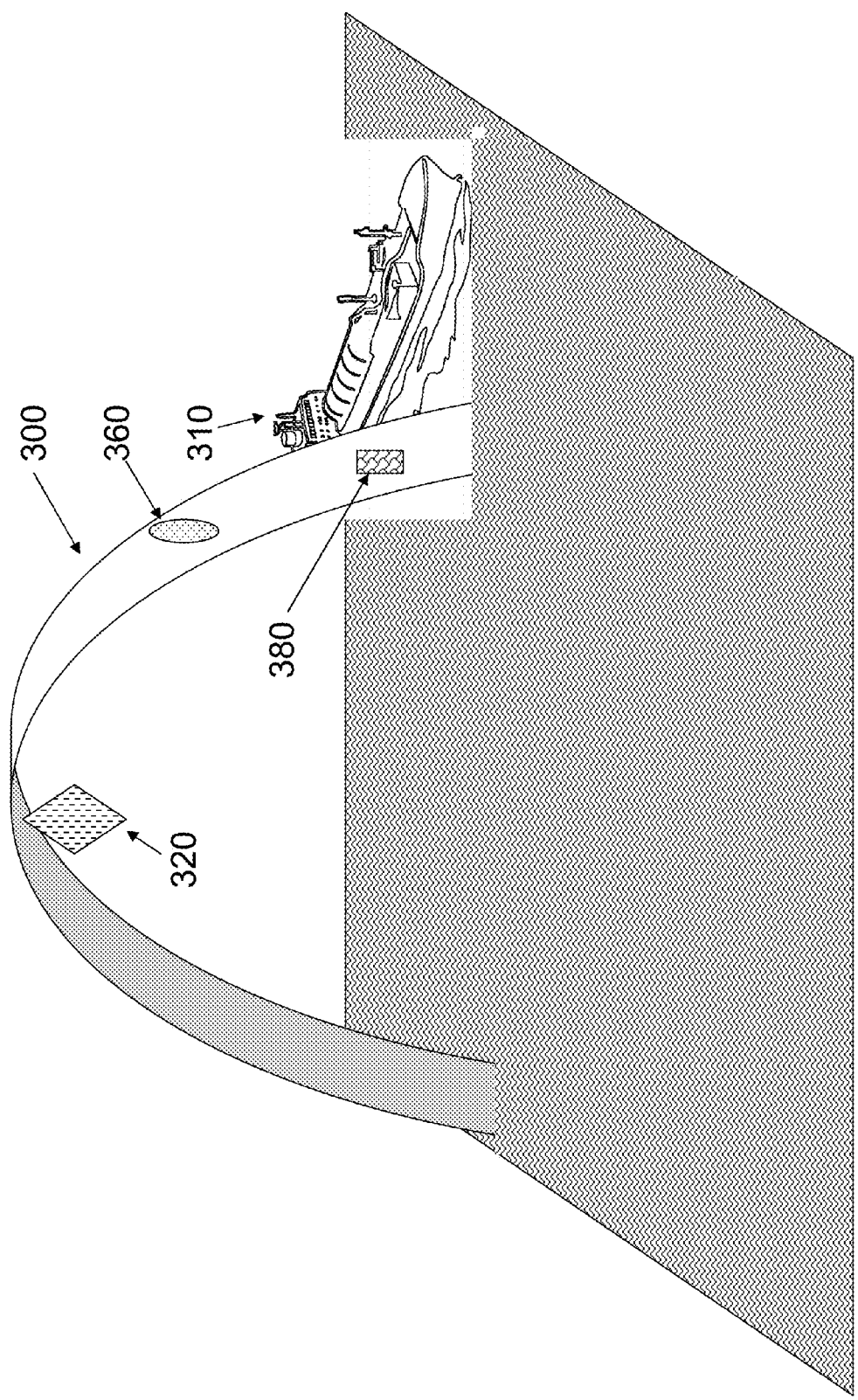
FIG. 3 is a schematic representation of a ship circumventing a security arch as described in the instant invention.

Attention is turned to FIG. 3 which shows an embodiment of the instant invention. An arch 300 includes a security camera 360 which can identify a ship 310 that attempts to circumvent or skirt passage through or in proximity to said arch 300. A ship 310 may bypass an arch 300 by mistake or intentionally. In the latter case, problematic persons or materiel may be behind the ship 310 behavior. The security camera 360 can send information in real time to port personnel or other security officials to alert them to the fact that said ship 310 passed outside of the arch 300 measurement zone. The security camera 360 may be part of the sensing elements 320 or may be a separate element as shown for convenience in FIG. 3. Additional cameras (not shown) may be included to allow for coverage of all regions around the arch 300. Additionally, the security camera 360 may include thermal imaging, underwater imaging or night vision capabilities in order to identify ships passing outside of the arch at night or in a submarine environment.

While the arch 300 described in the instant invention is primarily for national security use, it could additionally be used for tolls or other expenses. In such a case, sensing elements 320 could read the RFID or other device used for remote payment of tolls (similar to the EZPass on the US highways), and the camera 360 could identify ships 310 that fail to pass through the arch in order to avoid paying tolls or other expenses. An incapacitation element 380 may be used to stop and/or destroy a ship 310 that appeared to present a danger to others or that refused to go through the security arch 300. An incapacitation element 380 may include but is not limited to electronic disabling pulses, torpedoes, rockets, artillery, lasers, ray-based weapons, depth charges or the like.

Fourth Embodiment

Figure 4:
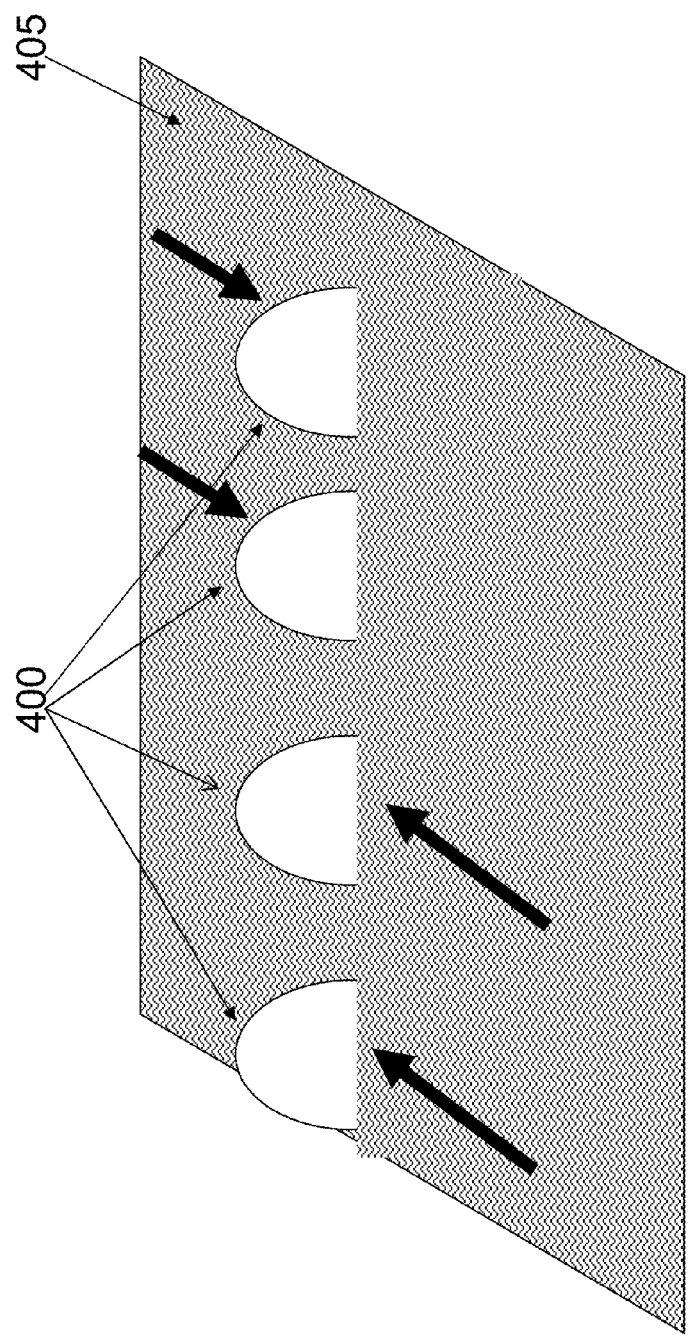
FIG. 4 is a schematic representation of an embodiment of the present invention in which a plurality of security arches is employed for monitoring shipping traffic to and from a port.

Attention is turned to FIG. 4 which shows an embodiment of the instant invention. Arches 400 are placed in a body of water 405 in order to allow for transit of ships in directions both to and from a port, as suggested by the arrows. Large ports such as those in Singapore, New York, Los Angeles and Hong Kong will benefit from having a plurality of arches 400 so as to facilitate rapid and efficient shipping to and from port. The arches are generally placed several kilometers from port so as to allow for interdiction and boarding of any ship that appears to contain dangerous or illegal persons or materiel.

Fifth Embodiment

Figure 5:
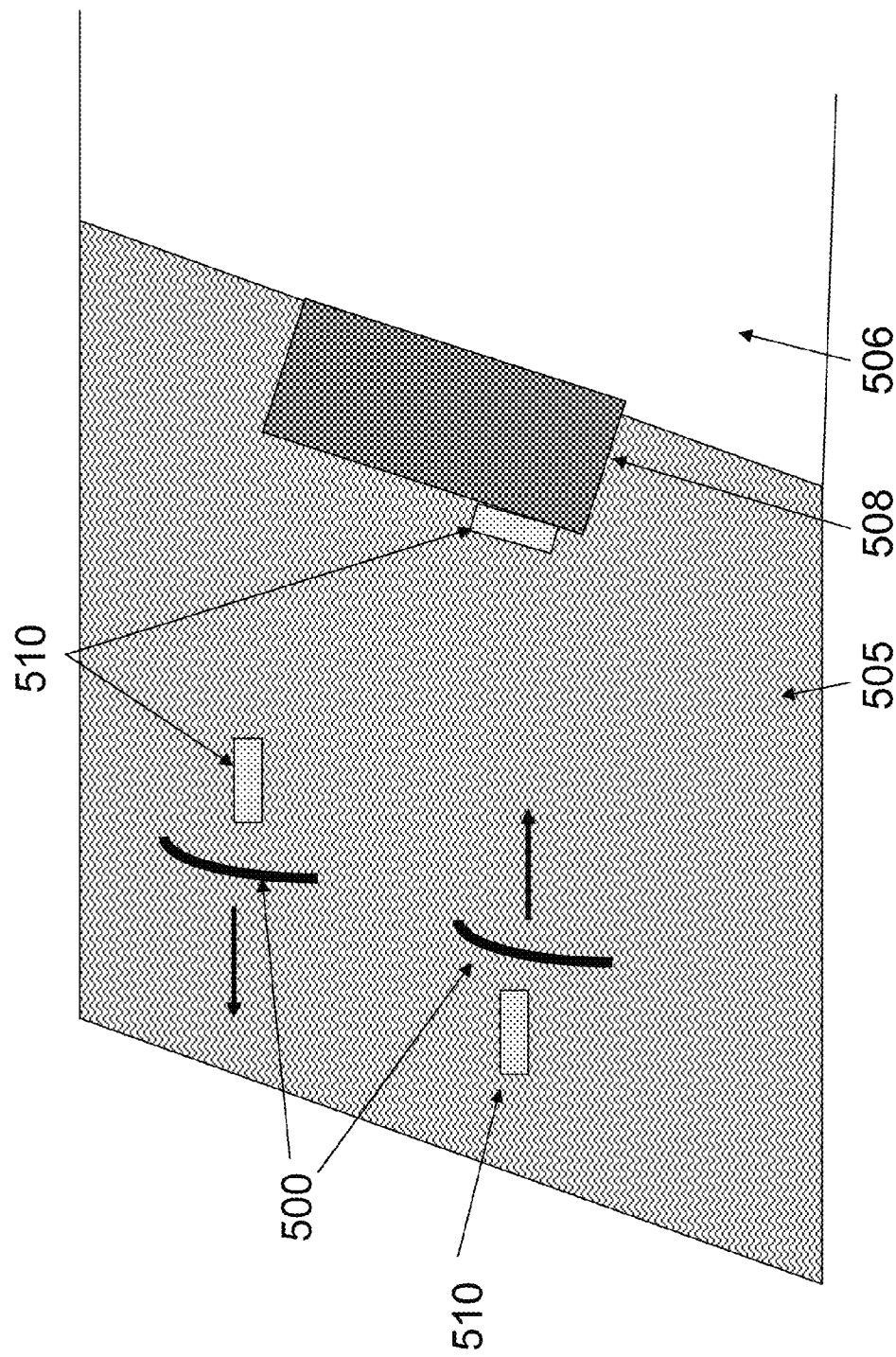
FIG. 5 is a schematic representation of an embodiment of the present invention showing security arches in position relative to an active shipping port.

Attention is turned to FIG. 5 which shows an embodiment of the instant invention. A body of water 505 meets land 506 where there is a port 508. Ships 510 are located at port 508 as well as out to sea in the body of water 505. Arches 500 are placed so as to allow for ships 510 approaching and leaving said port 508, as suggested by arrows in the figure. Arches 500 may be mobile or permanent in their disposition in the body of water 505. Arches 500 may be made of any material and of any relevant shape to allow for ship 510 passage as well as analysis with appropriate analytical and diagnostic equipment (not shown in detail in this figure). Arches 500 may send information on passing ships 510 to the port 508 and/or to other locations including but not limited to local police, national security officials, armed forces, FBI, NSA, Homeland Security, CIA, immigration, or customs.

Sixth Embodiment

Figure 6:
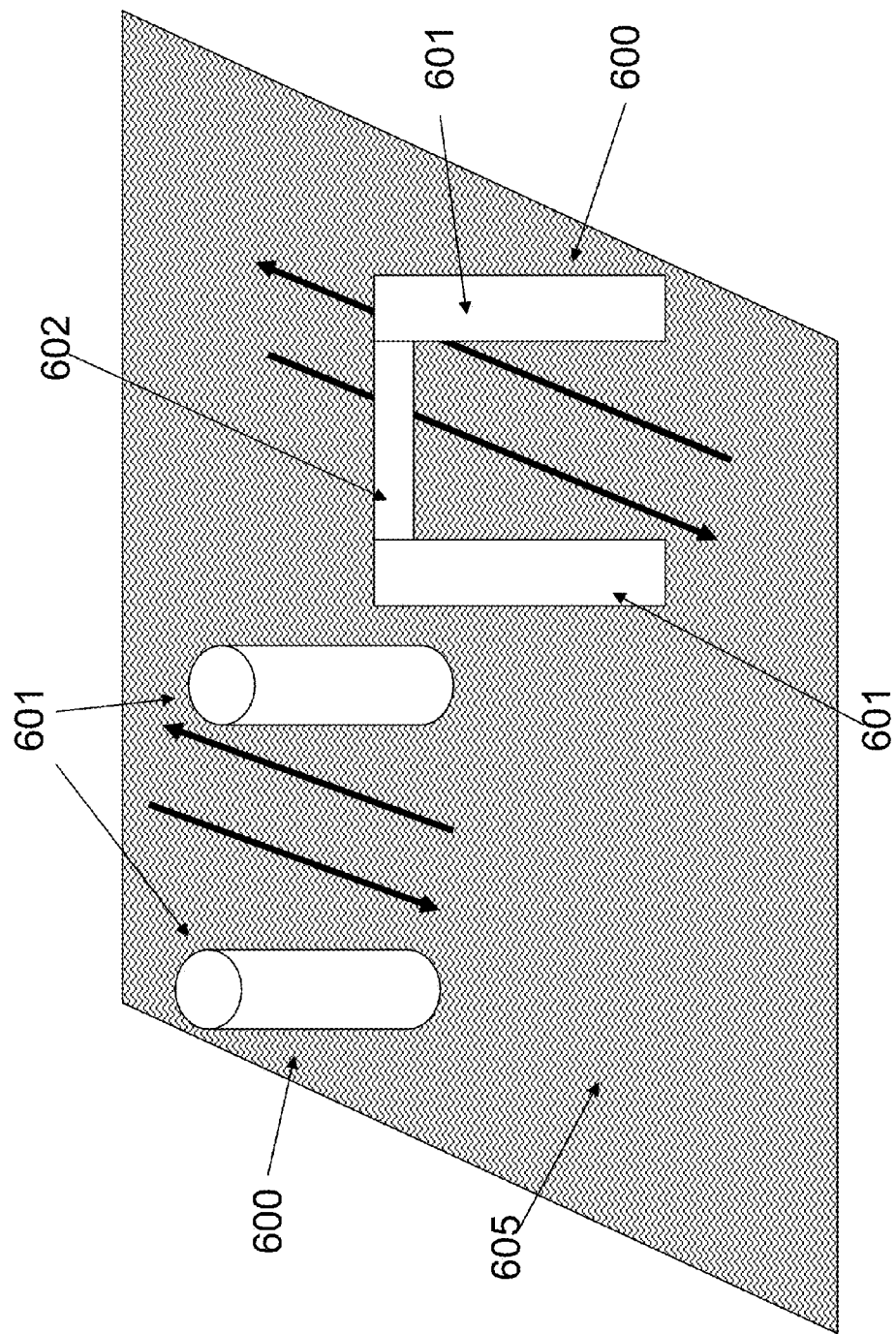
FIG. 6 is a schematic representation of embodiments of the present invention in which no overhead region is employed in the arch or wherein the arch is rectangular in shape.

Attention is turned to FIG. 6, which shows alternative arch 600 configurations. In a body of water 605 are shown two arches 600. On the left side of the figure is an arch 600 with legs 601 but no cross piece. The legs 601 may both or singly include diagnostic and/or sensing equipment. The legs 601 are placed at a spacing, generally around 100 meter so as to allow for facile ship passage between the legs 601. On the right side of the figure is an arch 600 with a squared relationship between legs 601 and cross piece 602. Diagnostic and/or sensing equipment (not shown) may be hung on the cross piece 602 or attached to the legs 601 for analysis of passing shipping. An alternative configuration (not shown) may include a cross piece 602 with no legs 601, if a relevant infrastructure element (not shown) is available to hold the cross piece 602.

Seventh Embodiment

Figure 7:
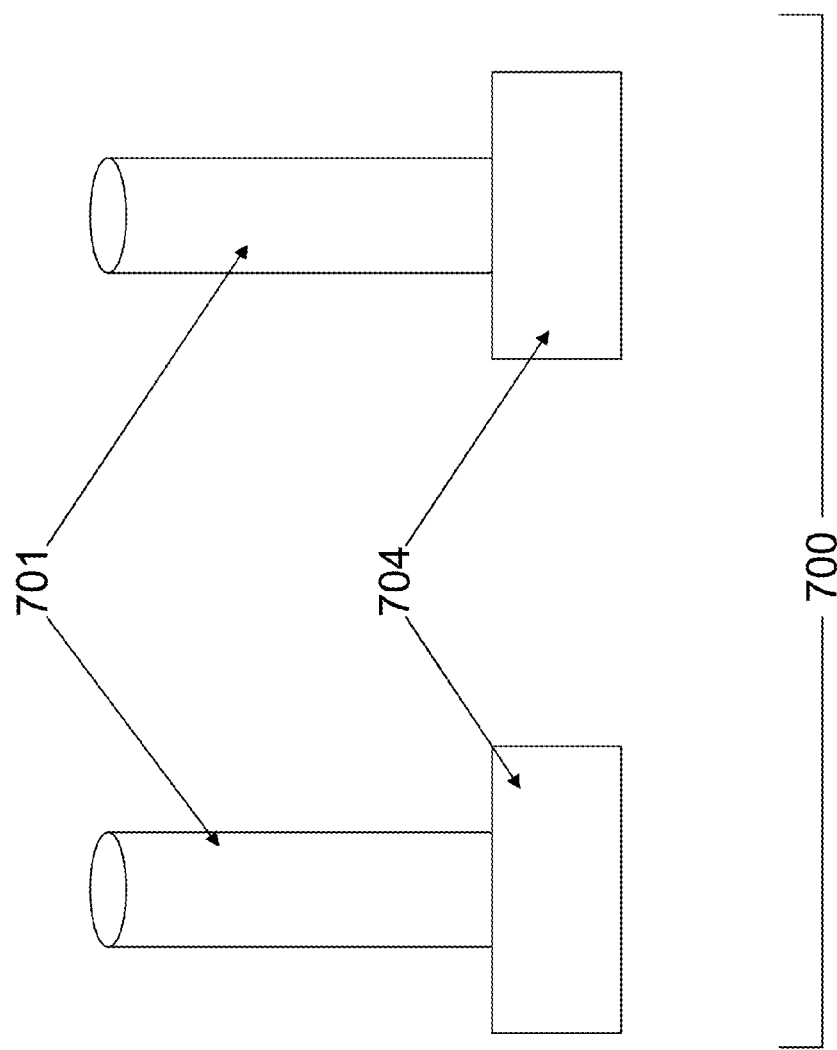
FIG. 7 is a schematic representation of component legs of a security arch that include a motor for moving said legs.

Attention is turned to FIG. 7, which shows an alternative embodiment of legs 701 of an arch 700. The legs 701 each include a motor 704 which allows for movement of the legs 701. The motor 704 may be used to either place a leg 701 in a predetermined position and/or to continue holding said leg 701 in a predetermined position. The leg 701 may further include an anchor (not shown) to hold a leg 701 in place as desired. [The same system may be applied to an arch that has a top or cross piece (not shown in FIG. 7)].

Eighth Embodiment

Figure 8:
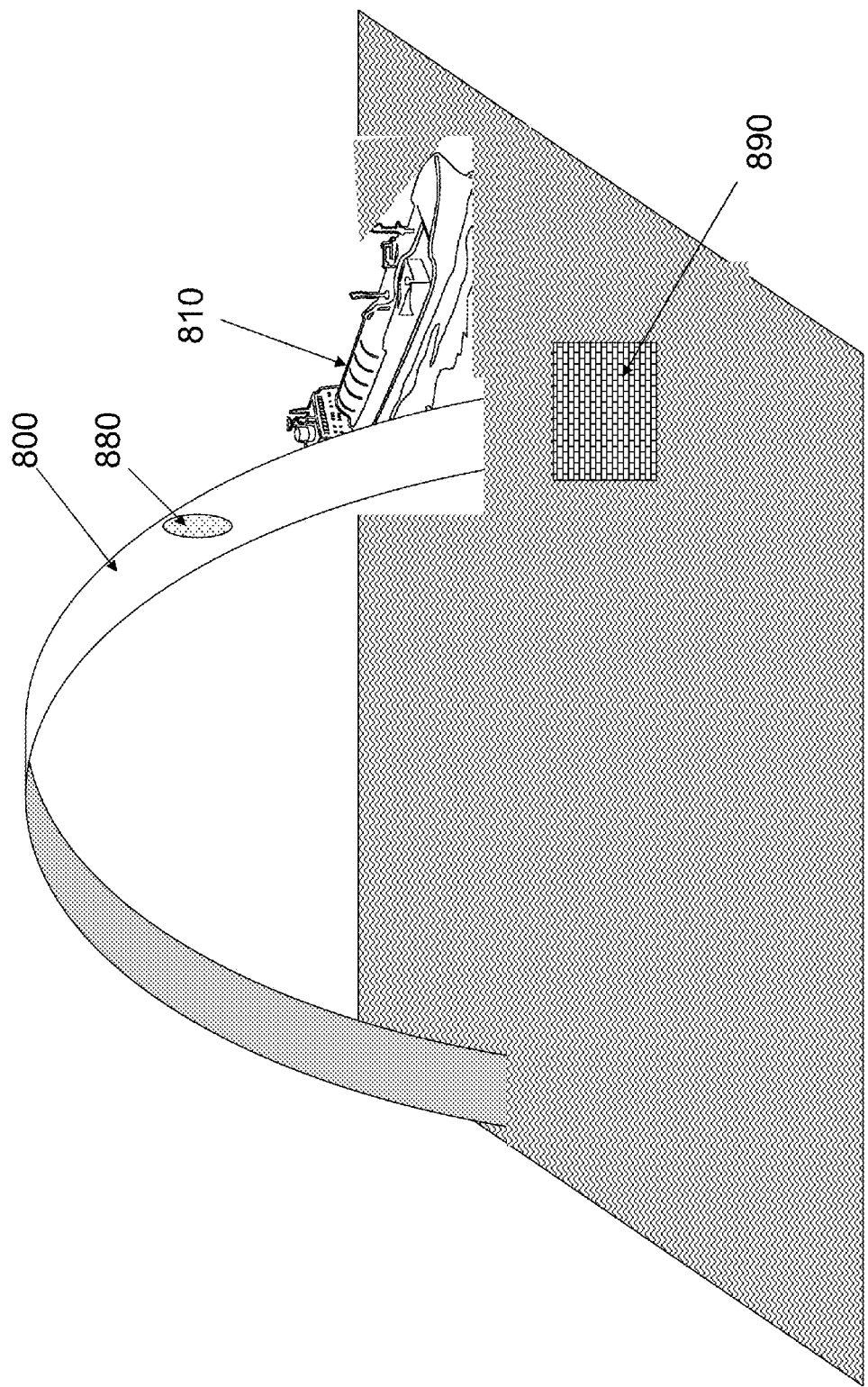
FIG. 8 is a schematic representation of an embodiment of the instant invention that includes a police dock in proximity to a security arch.

Attention is turned to FIG. 8 which shows an alternative embodiment of the present invention. An arch 800 includes a security camera 880 which can detect a ship 810 that passes outside of said arch 800. The security camera 880 may include infrared capabilities for day/night detection or may be placed under water for submarine vessel detection (not shown). Passage of a ship 810 outside of the arch 800 can allow for an appropriate response. A nearby police dock 890 allows for immediate response to any attempts to outskirt the arch 800. Alternatively, data from said security camera 880 may be sent to a port, to police, national security officials or others who may deal with a ship 810 that has bypassed the security arch 800.

Ninth Embodiment

Figure 9:
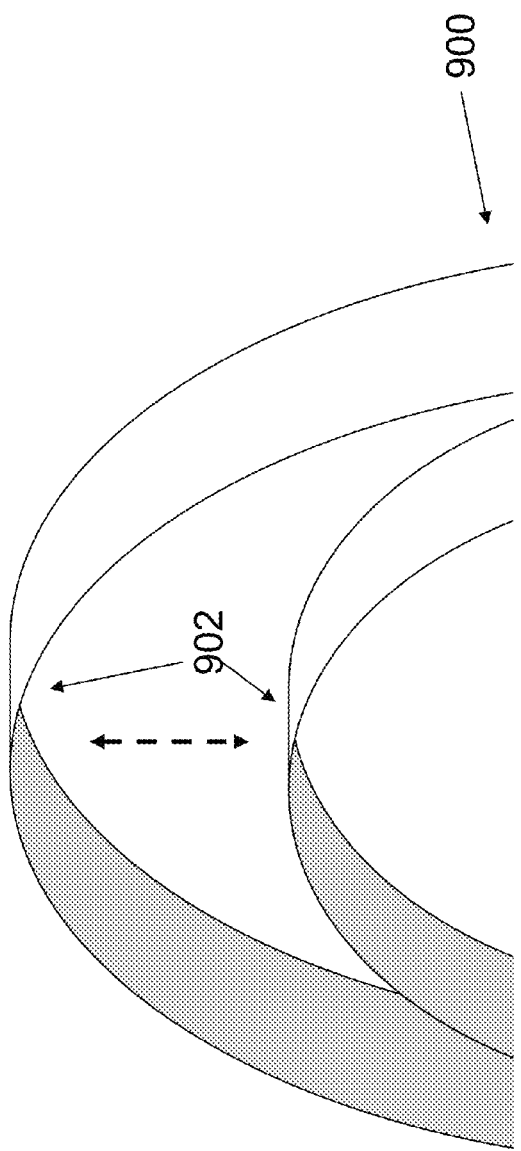
FIG. 9 shows an aspect of security arch wherein the dimensions of a security arch may be altered in response to the size and shape of a ship passing through said security arch; and, FIG. 10 shows a flowchart associated with a method of the present invention.

Attention is turned to FIG. 9 which shows a feature of the instant invention. An arch 900 includes a cross piece 902 whose height may be changed. The cross piece 902 includes analytical and diagnostic elements (not shown) and the cross piece 902 may be raised or lowered according to the height of an approaching ship or its containers, as suggested by the arrows. This feature allows for getting diagnostic or analytical elements as close as possible to a ship so as to allow for easier air analysis for traces of explosives, radiological trace elements, or the like as well as more precise photography or other optical analyses.

Tenth Embodiment

Figure 10:
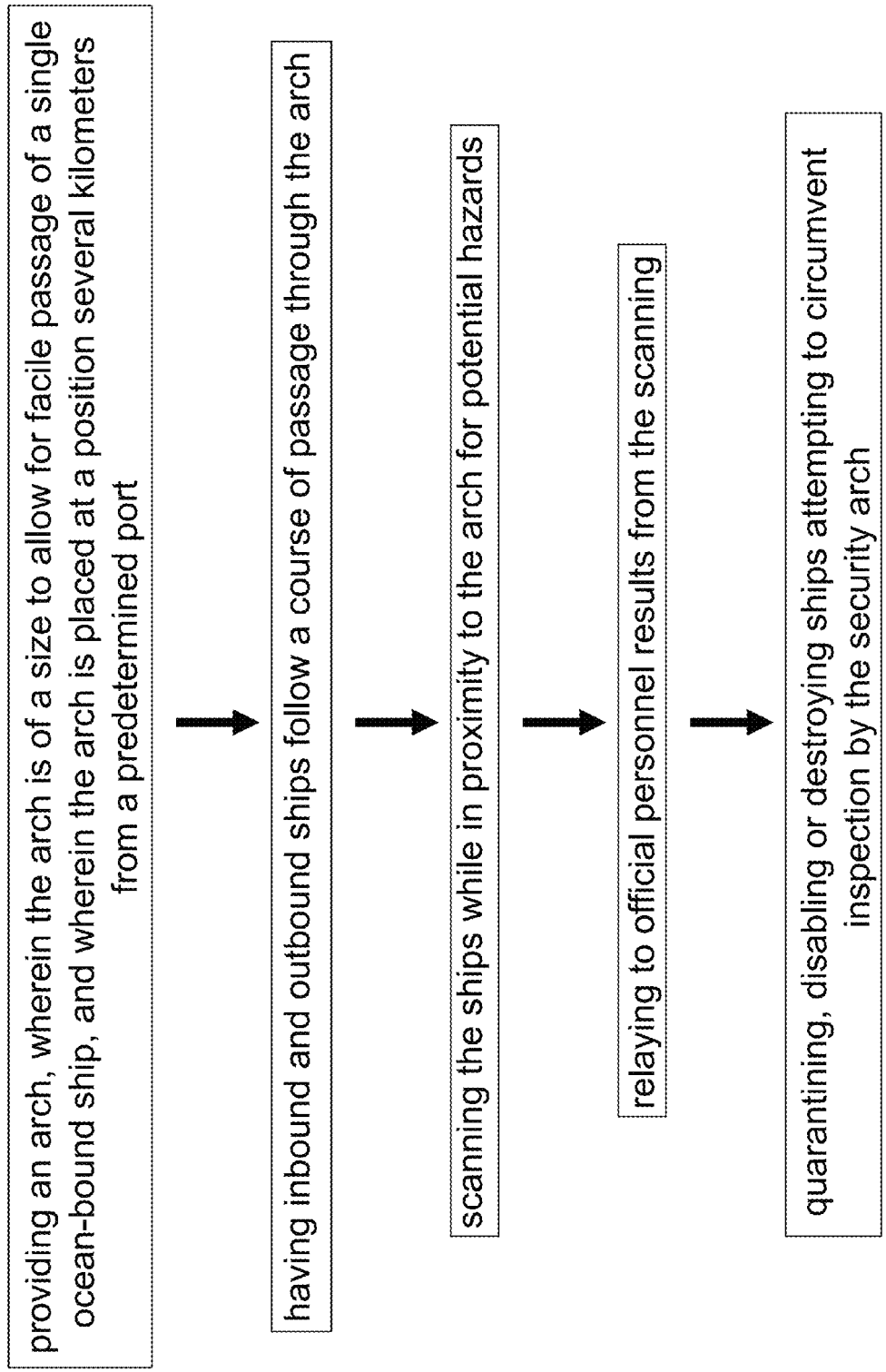

Attention is turned to FIG. 10 which shows a method for scanning inbound and outbound ships for potential threats, including the following: providing an arch, wherein the arch is of a size to allow for facile passage of at least a single ocean-bound ship, and wherein the arch is placed at a position several kilometers from a predetermined port; having inbound and outbound ships follow a course of passage through the arch; scanning the ships while in proximity to the arch for potential hazards; relaying to official personnel results from the scanning; and, quarantining, disabling or destroying ships attempting to circumvent inspection by the security arch. Scanning may be performed with a plurality of scanning and analytical devices as previously described. Said quarantining, disabling, or destroying of ships may be performed by a variety of means including but not limited to explosive charges, boarding of ships, mines, surface-to-surface missiles, and electronic jamming of ship navigation.

EXAMPLES

In order to prevent dangerous or illegal contraband from reaching its shores, the US Coast Guard deploys a plurality of mobile security arches outside of NY harbor. Each security arch has a width to allow for facile passage of any known freighter or tanker, while the height of the arch may be adjusted according to the height of passing vessels. The arches, constructed according to an embodiment of the instant invention, are mobile and may be anchored several miles away from the US shoreline and in groups so as to receive traffic from a plurality of approaches. The arches are controlled by a land-based control room. As ships approach New York, they are instructed to pass through one of the security arches. The height of the security arch is raised or lowered so as to be in close non-contact proximity with the passing ship. A ship passing through the arch is scanned with different diagnostic devices that may include but are not limited to digital photography, X-ray and neutron scanning, as well as thermal imaging. Samples taken from the water around the ship, the air in proximity to the ship, and swipe samples taken from contacting portions of the ship and/or its containers are all analyzed for radioactive or other problematic residues. Should a ship skirt the arches—intentionally or otherwise—cameras will alert staff in the control room who may either contact the ship and/or initiate an interdiction of the ship. Identification of problematic cargo may lead to direct Coast Guard intervention, with anchoring and boarding for cargo/crew analyses.

It is expected that during the life of a patent maturing from this application, additional plasma-based energy systems will be developed, and the scope of the term of the invention is intended to include all such new technologies a priori.

As used herein the term "about" refers to ±10%.

The terms "comprises", "comprising", "includes", "including", "having" and their conjugates mean "including but not limited to".

The term "consisting of means "including and limited to".

The term "consisting essentially of" means that the, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. The present invention could be employed on land for scanning of trucks, trains, cars, automobiles and other mobile carriers for contraband or dangerous cargo.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed:

1. A security system for interrogating shipping including the following: an arch, wherein said arch is of dimensions to allow for the passage of a freight, passenger, oil bearing or other ship through an open space of said arch;
   a plurality of sensing devices, wherein said devices are associated with said arch and are adapted to collect and analyze air around said ship, record thermal images of said ship and detect radiological energy around said ship;
   a control system, wherein said control system controls the actions of said sensing devices and allows for communication of sensing data or ship non-compliance with authorities; and
   wherein said sensing devices include x-ray scamper, neutron scatter device, gamma ray counter, Geiger counter, photographic equipment, RFID readers, listening elements, infrared, explosive detectors, water testing elements, and other sensors for detecting illegal, dangerous, or unsafe cargo or persons.

2. The security system according to claim 1, wherein said arch is realized as a plurality of arches, each arch including a security camera to detect ships that attempt to circumvent and not pass through said arch.

3. The security system according to claim 1, wherein said arch is placed at a predetermined distance from a predetermined port, and wherein all shipping traffic associated with said port is required to pass through said arch, said shipping traveling generally to or from said port.

4. The security system according to claim 1, wherein said arch is placed a fixed position and further includes an incapacitating element to stop suspect shipping.

5. The security system according to claim 1, wherein said arch is mobile and may be moved either under its own power or via a tow to a plurality of predetermined positions.

6. The security system according to claim 1, wherein said control system can identify potential security threats and relay information regarding said threats to official personnel, said relay performed via phone, Internet, radio, satellite, cable, wireless, or other forms of communication.

7. The security system according to claim 3, wherein said predetermined distance is selected to allow for stoppage, quarantine and if necessary incapacitation of a suspicious or non-compliant ship.

8. A method for scanning inbound and outbound ships for potential threats, including the following:
   providing an arch, wherein said arch is of a size to allow passage of a single ocean-bound ship, and wherein said arch is placed at a position a predetermined distance from a predetermined port;
   directing inbound and outbound ships follow a course of passage through said arch; adjusting a height of said arch to allow for passage of said ships;
   scanning said ships while in proximity to said arch for potential hazards with a plurality of sensing devices;
   wherein said sensing devices include x-ray scamper, neutron scatter device, gamma ray counter, Geiger counter, photographic equipment, RFID readers, listening elements, infrared, explosive detectors, water testing elements, and other sensors for detecting illegal, dangerous, or unsafe cargo or persons;
   relaying to official personnel results from said scanning;
   taking water samples for radioactive analysis from around said ship;
   swiping the side of said ship or its cargo for radioactive analysis; and, quarantining, disabling or destroying ships attempting to circumvent inspection by said security arch.

9. The method according to claim 8, further including the steps of detecting ships that attempt to circumvent said arch and relaying said attempt to circumvent to port-based or national security personnel.

10. The method according to claim 8, wherein said hazards include but are not limited to explosives, nuclear material, weaponry, biological agents, and people.

11. The method according to claim 8, wherein a portion of said arch may physically contact said ships and/or intake air or water samples from around said ships.

12. The method according to claim 8, wherein said scanning is performed over the length and breadth of said ships above and below the water surface.

13. A security arch for preventing dangerous contraband from reaching a port or shore region, including the following:
an arch placed at a predetermined distance from a predetermined port; sensing equipment including x-ray scanner, neutron scatter device, gamma ray counter, Geiger counter, photographic equipment, RFID readers, listening elements, infrared, explosive detectors, and water testing elements, wherein said sensing equipment is adapted to be directed at the cargo of a ship passing underneath said arch for identifying said contraband or identifying a ship's attempt at circumvention of said arch; communication equipment wherein said communication equipment is adapted to allow for alerting appropriate authorities as to the existence of said contraband passing through said arch; and, disabling equipment, wherein said disabling equipment is adapted to allow for quarantining, disabling or destroying ships attempting to circumvent the inspection by said security arch.

14. The arch according to claim 13, wherein said arch is made from inflatable material.

15. The arch according to claim 13, wherein said arch is realized as an open structure lacking an overhead component.

16. The arch according to claim 13, wherein said arch may have its dimensions of height and width modified hydraulically.

17. The arch according to claim 13, wherein said sensing equipment is monitored and controlled by a user.

18. The arch according to claim 17, wherein said sensing equipment provides an output of sensing activities to said user.

19. The arch according to claim 13, further including an alarm system that may be activated by results from action of said sensing equipment, wherein said alarm system may activate elements for disabling or destroying a suspect ship.

* * * * *